(12) United States Patent
Lu et al.

(10) Patent No.: US 8,945,790 B2
(45) Date of Patent: Feb. 3, 2015

(54) MICROPOROUS LAYER STRUCTURES AND GAS DIFFUSION LAYER ASSEMBLIES IN PROTON EXCHANGE MEMBRANE FUEL CELLS

(71) Applicant: Ford Global Technologies, LLC, Dearborn, MI (US)

(72) Inventors: Zijie Lu, Novi, MI (US); James Waldecker, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 71 days.

(21) Appl. No.: 13/832,943

(22) Filed: Mar. 15, 2013

(65) Prior Publication Data

US 2014/0272659 A1    Sep. 18, 2014

(51) Int. Cl.
*H01M 4/86* (2006.01)
*H01M 8/04* (2006.01)

(52) U.S. Cl.
CPC ............................... *H01M 8/04291* (2013.01)
USPC ............ 429/480; 429/413; 429/414; 429/481

(58) Field of Classification Search
USPC .......................... 429/413, 414, 450, 480–483
See application file for complete search history.

(56) References Cited

U.S. PATENT DOCUMENTS

| | | | |
|---|---|---|---|
| 4,038,463 A * | 7/1977 | Lamarine et al. | 429/529 |
| 7,862,956 B2 | 1/2011 | Johnston et al. | |
| 7,923,172 B2 | 4/2011 | De Castro et al. | |
| 8,197,983 B2 | 6/2012 | Cha et al. | |
| 2006/0199061 A1 | 9/2006 | Fiebig et al. | |
| 2006/0228606 A1 | 10/2006 | Fiebig et al. | |
| 2007/0099068 A1 | 5/2007 | Suzuki et al. | |
| 2008/0241623 A1 | 10/2008 | Mossman et al. | |
| 2010/0092811 A1 | 4/2010 | Badrinarayanan | |
| 2010/0227244 A1 * | 9/2010 | Song et al. | 429/468 |
| 2010/0305217 A1 | 12/2010 | Qiu et al. | |
| 2011/0097639 A1 * | 4/2011 | Darling et al. | 429/434 |
| 2011/0183232 A1 | 7/2011 | Tsou et al. | |

(Continued)

FOREIGN PATENT DOCUMENTS

| | | | |
|---|---|---|---|
| JP | 2007323975 A | * | 12/2007 |
| JP | 2010061966 A | * | 3/2010 |
| TW | 200830611 | | 7/2008 |

(Continued)

OTHER PUBLICATIONS

Ryan Anderson et al., A Critical Review of Two-Phase Flow in Gas Flow Channels of Proton Exchange Membrane Fuel Cells, Journal of Power Sources 195, 2010, pp. 4531-4553.

(Continued)

*Primary Examiner* — Gregg Cantelmo
(74) *Attorney, Agent, or Firm* — Damian Porcari; Brooks Kushman P.C.

(57) ABSTRACT

In at least one embodiment, a microporous layer configured to be disposed between a catalyst layer and a gas diffusion layer of a fuel cell electrode assembly is provided. The microporous layer may have defined therein a plurality of hydrophilic pores, a plurality of hydrophobic pores with a diameter of 0.02 to 0.5 μm, and a plurality of bores with a diameter of 0.5 to 100 μm. The microporous layer structures and gas diffusion layer assemblies disclosed herein may be defined by a number of various designs and arrangements for use in proton exchange membrane fuel cell systems.

14 Claims, 6 Drawing Sheets

(56) References Cited

U.S. PATENT DOCUMENTS

2011/0207022 A1 8/2011 Wieser et al.
2011/0229823 A1 9/2011 Rock et al.

FOREIGN PATENT DOCUMENTS

WO           2009120976 A1    10/2009
WO       WO 2011149442 A1 *  12/2011

OTHER PUBLICATIONS

L. Cindrella et al., Gas Diffusion Layer for Proton Exchange Membrane Fuel Cells—A Review, Journal of Power Sources 194, 2009, pp. 146-160.

Jeff T. Gostick et al., On the Role of the Microporous Layer in PEMFC Operation, Electrochemistry Communications 11, 2009, pp. 576-579.

Satish G. Kandlikar et al., Fundamental Research Needs in Combined Water and Thermal Management Within a Proton Exchange Membrane Fuel Cell Stack Under Normal and Cold-Start Conditions, Journal of Fuel Cell Science and Technology, Nov. 2009, vol. 6, pp. 0044001-1-0044001-13.

Guangyu Lin et al., A Two-Dimensional Two-Phase Model of a PEM Fuel Cell, Journal of the Electrochemical Society 153, 2006, pp. A372-A382.

Zijie Lu et al., Water Management Studies in PEM Fuel Cells, Part III: Dynamic Breakthrough and Intermittent Drainage Characteristics From GDLs With and Without MPLs, International Journal of Hydrogen Energy 35, 2010, pp. 4222-4233.

Jon P. Owejan et al., Water Management Studies in PEM Fuel Cells, Part I: Fuel Cell Design and in Situ Water Distributions, International Journal of Hydrogen Energy 34, 2009, pp. 3436-3444.

Zhigang Qi et al., Improvement of Water Management by a Microporous Sublayer for PEM Fuel Cells, Journal of Power Sources 109, 2002, pp. 38-46.

U.S. Department of Energy, Fuel Cell Technologies Program Multi-Year Research, Development and Demonstration Plan, Section 3.4—Fuel Cells, Oct. 2007, http://www1.eere.energy.gov/hydrogenandfuelcells/mypp/pdfs/fuel_cells.pdf.

Cortney Mittelsteadt et al., Dimensionally Stable High Performance Membrane (SBIR Phase III), Giner Electrochemical Systems, LLC (GES) FY 2011 Annual Progress Report, Oct. 1, 2010, pp. 671-674, Giner Electrochemical Systems, LLC, Newton, MA, USA.

H. Chraibi et al., Influence of Wettability on Liquid Water Transport in Gas Diffusion Layer of Proton Exchange Membrane Fuel Cells (PEMFC), Institut de Mecanique des Fluides de Toulouse, UMR CNRS-INP/UPS No. 5502, 7 pages, Toulouse and Gif-Sur-Yvette, France.

* cited by examiner

MICROPOROUS LAYER STRUCTURES AND GAS DIFFUSION LAYER ASSEMBLIES IN PROTON EXCHANGE MEMBRANE FUEL CELLS

TECHNICAL FIELD

This disclosure relates to microporous layer structures and gas diffusion layer assemblies for use in proton exchange membrane fuel cell systems.

BACKGROUND

The presence and management of water within proton exchange membrane fuel cells (PEMFCs) are key factors in the performance, durability, and cost associated with the resultant fuel cell systems. Dependent upon the specifications of the particular system, a certain minimum amount of water is required to maintain hydration of the fuel cell membrane and to facilitate efficient proton conductivity in the polymer electrolyte. Moreover, liquid water is a preferable reactant at the anode under fuel starvation conditions that often can occur during fuel cell startup and shutdown; otherwise, carbon may react in substituting hydrogen to sustain the power requirement, which leads to catalyst carbon corrosion and fuel cell degradation. While a certain level of water is required for efficient operation of the fuel cell, excess water accumulation in the system's gas channels and porous electrodes, including the catalyst and gas diffusion layers, can lead to a variety of performance and durability problems. Such problems can include voltage loss at high current density due to reactant gas transport limitations, voltage instability at low current density, unreliable startup under freezing conditions, and corrosion of the carbon catalyst support due to hydrogen starvation. In light of these requirements and drawbacks, water management within PEMFC systems is integrally important to their operation.

SUMMARY

Microporous layer structures for use in gas diffusion layer assemblies are disclosed. The disclosed microporous layers are configured to be disposed between a catalyst layer and a gas diffusion layer in either the anode or cathode regions of a proton exchange membrane fuel cell.

In at least one embodiment, a microporous layer is provided comprising a material layer configured to be disposed between a catalyst layer and a gas diffusion layer of a fuel cell electrode. The microporous layer may include a plurality of hydrophilic pores, a plurality of hydrophobic pores with a diameter of 0.02 to 0.5 μm, and a plurality of bores with a diameter of 0.5 to 100 μm.

In at least another embodiment, a microporous layer is provided comprising a material layer configured to be disposed between a catalyst layer and a gas diffusion layer of a fuel cell electrode. The microporous layer may include a plurality of hydrophilic pores with a diameter of 0.02 to 0.5 μm, a plurality of hydrophobic pores with a diameter of 0.02 to 0.5 μm, and a plurality of bores with a diameter of 1 to 20 μm. The plurality of hydrophilic pores, the plurality of hydrophobic pores, and the plurality of bores may be defined in a first material layer. The disclosed microporous layer may also include a second material layer configured to be disposed between the catalyst layer and the first material layer.

In at least yet another embodiment, a microporous layer forming a portion of a gas diffusion layer assembly positioned adjacent to a catalyst layer within a fuel cell electrode is provided. The microporous layer may include a first carbon-based material layer comprising a plurality of hydrophobic pores with a diameter of 0.05 to 0.2 μm and a plurality of bores with a diameter of 1 to 20 μm. The microporous layer may also include a second carbon-based material layer configured to be disposed between the catalyst layer and the first material layer. The second carbon-based material may comprise carbon and one or more fluorocarbon polymers. The first or second carbon-based material layer of the microporous layer may include two or more material regions, wherein at least two of the material regions are comprised of different substances.

In at least still another embodiment, a microporous layer is disclosed as including a material layer having defined therein a plurality of hydrophilic pores, a plurality of hydrophobic pores with a diameter of 0.05 to 0.2 μm, and a plurality of frustoconical bores, each having a base end having a diameter of 0.5 to 100 μm. The disclosed plurality of frustoconical bores may taper inward from the surface of the microporous layer adjacent the catalyst layer to the surface of the microporous layer adjacent the gas diffusion layer. The disclosed plurality of frustoconical bores may alternatively taper inward from the surface of the microporous layer adjacent the gas diffusion layer to the surface of the microporous layer adjacent the catalyst layer.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The water level within a fuel cell assembly strongly affects both the membrane properties and also reactant transport and electrode reaction kinetics. Therefore, water management is an important factor in achieving higher levels of cell performance. In order to achieve a suitable balance between the hydration requirements of various fuel cell components and the rejection of excess water from the fuel cell system, the design of the fuel cell can be tailored to effectively manage water under the given operating conditions of the system. A proton exchange membrane fuel cell (PEMFC) includes a number of components that can potentially employ particular material and structural designs in order to enhance water management within the assembly. As disclosed herein, the particular gas diffusion medium of a PEMFC, typically including a carbon fiber based gas diffusion layer (GDL) containing a microporous layer (MPL) coating disposed at the interface between the GDL and an adjacent catalyst layer (CL), performs an integral role in the management of water throughout both the electrode assembly and the larger fuel cell system. Based on the characteristics and operating conditions of a given PEMFC, the architecture of the GDL assembly, including the structure and design of the MPL, can be optimized in order to enhance the management of water throughout the fuel cell system.

In a typical PEMFC system, there are two main sources of liquid water. The first is the water produced by the oxygen reduction reaction which occurs at the cathode. The second source of liquid water includes condensation of the humidified gas feeds as reactants are consumed and the vapor pressure exceeds saturation pressure. According to Faraday's law, water generation at the cathode catalyst layer (CL) as a result of the reduction reaction can be determined by the following equation:

$$J_{H2O} = Mj/2F\rho \qquad (1)$$

where
$J_{H2O}$ is the water flux in $cm^3/(s \cdot cm^2)$;
M is the molecular weight of water (i.e., 18 g/mol);
j is the operating current density in $A/cm^2$;
F is the Faraday constant (i.e., approx. 96,485 C/mol); and
$\rho$ is the density of liquid water (i.e., 1 $g/cm^3$ at 25° C.).
Thus, the rate of liquid water production at the cathode electrode will be $5.6 \times 10^{-4}$ $cm^3/(min \cdot cm^2)$ for a fuel cell operating at 25° C. and a current density of 0.1 $A/cm^2$. The water produced at the cathode electrode can be absorbed by the fuel cell's proton exchange membrane (PEM) and the cathode CL and/or transported in either a liquid or vapor phase through the cathode GDL to the cathode gas channels.

In light of the potential for the CL to absorb water produced in the oxygen reduction reaction, the amount of water that can be stored in such a layer is an important factor in the resultant water management of the cell. This is especially true during fuel cell startup from subfreezing conditions that may be encountered in a variety of applications, including those in connection with PEMFC use in vehicles. The maximum water storage of the CL per unit active area can be estimated as follows based on the thickness and pore volume of the particular catalyst layer:

$$\text{Water Storage} = t_{CL} \times \epsilon_{CL} \qquad (2)$$

where
$t_{CL}$ is the thickness of the catalyst layer in cm; and
$\epsilon_{CL}$ is the porosity of the catalyst layer.
Assuming a catalyst layer thickness of 15 μm and a porosity of 0.4, as has been shown for a known Pt/C catalyst layer, the maximum water storage per unit active area is calculated to be $6 \times 10^{-4}$ $cm^3/cm^2$. Comparing this value to the water generation rate calculated in accordance with Equation 1, above, shows that the maximum water storage of a catalyst layer is generally small in comparison with the amount of water produced. For example, again assuming a porosity of 0.4, a Pt/C catalyst layer having a thickness of 15 μm can only support fuel cell operation at 0.1 $A/cm^2$ for approximately 1 minute before the catalyst layer becomes flooded. Obviously, for certain varieties of catalysts layers such as thin-film types including, e.g., 3M NSTF, electrode flooding can be expected even more rapidly based on the lesser thickness of such catalyst layers.

Actual water storage of the CL is likely to be less than the calculated amount in light of the fact that the porous CL also contains open pores for transporting reactant gas to some degree. Thus, at optimal operation condition, it can be assumed that only the primary pores of typical Pt/C CLs—characterized by diameters of between 20 and 40 nm—are filled with liquid water, while the larger secondary pores—characterized by diameters of between 40 and 100 nm—remain open for transport of reactant gas to the reaction sites. Since actual liquid water storage in the porous CL is likely less than that calculated in accordance with Equation 2, optimal fuel cell operation at a given current density should be possible for even less time than calculated above before the onset of extra mass transport resistance caused by CL flooding.

In practice, however, many fuel cells can operate at relatively high current densities without seeing apparent mass transport loss. This is of course because PEMFC systems have several mechanisms for the rejection of water from the CL. Two of such mechanisms for water removal are the temperature-driven vapor transport and capillary-driven liquid flow. Both of these mechanisms are achieved in connection with the gas diffusion media used in the system. The gas diffusion media generally, and more specifically the particular composition and structure of the GDL and MPL, allow water and associated vapor to be transported to the cathode gas channels where it can be carried away by the gas streams.

Temperature gradients which can exist within the fuel cell assembly also have an effect on the transportation of water from the active reaction sites to the gas flow channels. Due to the release of the reaction heat at the cathode CL and the finite thermal conductivity of a given GDL, the cathode CL may be at a higher temperature than that of the gas channel under operating conditions. Accordingly, temperature gradients, in the magnitude of a few degrees, have been observed across the cathode. Such gradients may promote liquid-to-vapor phase change inside the CL which drives the transport of water vapor from areas of higher saturation pressure to areas of lower saturation pressure. This effect drives liquid water and associated water vapor from the higher-temperature CL to the lower temperature regions which exist in the gas channels. The resultant temperature-driven vapor transport increases in magnitude with increasing fuel cell operating temperature and with larger temperature gradients across the electrode assembly.

The rate at which liquid water can be evaporated to a gas in the CL acts as a limit on the rate of vapor transport that can be achieved by the electrode assembly. The liquid/vapor interfacial area markedly affects the resultant evaporation rate within the CL. In regard to the cathode CL of a PEMFC, the liquid/vapor interfacial area is a function of menisci separating liquid and gas phases in the primary pores of the CL. The particular properties of certain cathode CLs, including pore size distribution, have been shown to afford the CL significant ability to transform liquid water into water vapor. In light of this, the density, size, and total volume of CL primary pores appear to be a significant factor in the observed rates of vapor transport.

In comparison to typical PEMFC system CLs, conventional GDL assemblies, such as a carbon-fiber-based paper coated with a Pureblack carbon-based MPL, are not nearly as well suited to the task of liquid-to-vapor conversion due to their generally much larger pore sizes.

In addition to temperature-driven vapor transport, PEMFCs also allow for capillary-driven liquid flow as means for water removal from the reaction sites. This additional mechanism for water removal is especially important at lower system temperatures and higher current densities when liquid water may accumulate inside the CL due to reduced temperature-driven vapor transport and greater water production at the cathode. The transport of liquid water in the porous CL and GDL by way of this mechanism is driven by the gradient of capillary pressure. The magnitude of the capillary-driven liquid flow flux is a function of capillary pressure of the porous fuel cell components and can thus be estimated in accordance with Darcy's law. Furthermore, the capillary pressure is a function of the water saturation within the porous components of the fuel cell. The capillary pressure can be determined in accordance with the following equation:

$$p_c = \sigma \cos(\theta) \sqrt{\frac{\varepsilon}{k}} J(s) \quad (3)$$

where
$p_c$ is the capillary pressure in Pa;
$\sigma$ is the surface tension of water (=0.072 N/m at 20° C.);
$\theta$ is the contact angle of water in porous component;
$\varepsilon$ is the pore volume of the porous component;
k is the is the water permeability in $m^2$;
s is the water saturation in porous component; and
J(s) is the Leverett J-function.

In connection with Equation 3, known GDLs commonly exhibit a water saturation gradient characterized by higher saturation at locations near the CL. This type of saturation gradient is potentially detrimental to the transport of reactant gases since higher water saturation levels at the interface between the GDL assembly and the CL interfere with gas transport. The resultant distribution of water within the GDL assembly may even create a water film that can completely block the gas transport. Once a water film is formed at the GDL/CL interface, its redistribution within the system may take a substantial amount of time; thereby causing an extended flooding recovery process. Such a result most likely to occur at fuel cell operation transients including startup and shutdown.

In known PEMFC systems, gas diffusion media materials often include carbon fiber based paper and cloth with a thicknesses of about 200 μm. Such materials are highly porous (having porosities of about 80%) so as to allow for transport of both reactant gas to the catalyst layer and liquid water from the catalyst layer. In order to facilitate the removal of liquid water, GDLs are typically treated with a non-wetting polymer such as polytetrafluoroethylene (PTFE) so as to produce a hydrophobic character of the GDL material. Moreover, the GDL is commonly coated on its CL-facing side with microporous layer (MPL) consisting primarily of carbon powder and PTFE particles.

The particular characteristics and structure of the MPL used in the GDL assembly can play a key role in the management of water throughout the fuel cell electrode. Accordingly, the architecture and composition of the MPL can have a significant impact on the overall performance of the fuel cell system. Specifically, the MPL can have the effects of increasing water transport to the anode—thereby improving humidification of the membrane at the anode side—reducing flooding in the cathode by enhancing oxygen diffusion and water transport, and improving the contact at the interface between the CL and GDL.

By designing the material and structural configuration of the MPL, enhancements to overall water management within the fuel cell system may be achieved. MPLs disclosed herein have the ability to effectively address the detrimental water saturation gradients common to GDL assemblies. New varieties of CLs that are now emerging in the art, such as thin-film type CLs, have the potential to increase fuel cell durability while decreasing cost. Despite these benefits, many of these CLs, including thin-film type, are prone to flooding as a result of limited water storage in electrode assembly and the limited liquid-to-vapor phase change locations. The disclosed MPL structures can provide water management enhancements to help harness the potential of these new types of catalyst layers.

Figure 1:
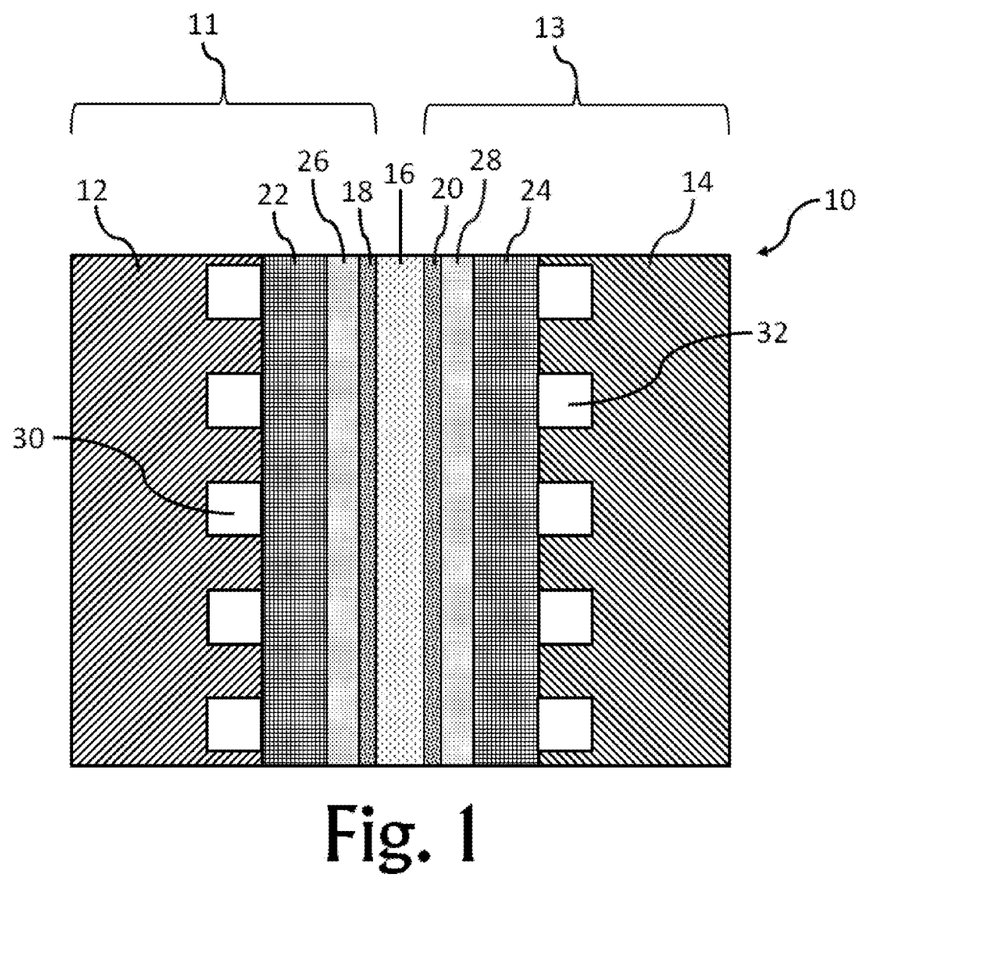
FIG. 1 is a schematic drawing of a proton exchange membrane fuel cell (PEMFC) assembly.

Referring now to the figures, FIG. 1 depicts an example of a proton exchange membrane fuel cell (PEMFC) assembly 10. The PEMFC assembly (or system) 10 generally includes a proton exchange membrane (PEM) 16 (e.g., a polymer electrolyte membrane) separating two electrode assemblies—a negative electrode, or anode 11, and a positive electrode, or cathode 13. The anode assembly 11 includes anode plate 12 that incorporates anode flow channels 30. The anode flow channels 30 deliver hydrogen fuel to the anode. Similarly, the cathode assembly 13 includes cathode plate 14 that incorporates cathode flow channels 32. The cathode flow channels 32 deliver oxidant, such as oxygen, to the cathode. The anode 11 and cathode 13 each include a catalyst layer (CL), 18 and 20, respectively. The anode assembly 11 further includes a gas diffusion layer 22 which is separated from the anode CL 18 by a microporous layer (MPL) 26. Similarly, cathode assembly 13 includes its own gas diffusion layer 24 which is separated from the cathode CL 20 by a microporous layer (MPL) 28. The MPL commonly includes a material coating on the CL-facing surface of the GDL. The combination of a GDL, 22 or 24, and its associated MPL, 26 or 28, may herein be generally referred to as the "gas diffusion media" or "gas diffusion layer assembly," in one or more embodiments.

As explained above, in contrast to typical CLs, the larger pore sizes which exist in conventional GDL assemblies, such as a carbon-fiber-based paper coated with a Pureblack carbon-based MPL, hinders liquid-to-vapor conversion of water within the gas diffusion media. Known GDLs do, however, allow for high gas permeability and high electrical and thermal conductivity which benefit the operation of the fuel cell. By designing both the material composition and structural architecture of the MPL to be used in conjunction with the GDL, enhanced water management within the GDL assembly—and the electrode and fuel cell system more broadly—can be achieved without damaging the merits of conventional GDLs. The MPLs disclosed herein improve the water/ice tolerance of the electrode assembly, promote increased liquid-to-vapor phase change within the gas diffusion media, and enhance the transport rates of water in both liquid and vapor form. Each of these benefits provides for robust fuel cell operation under both normal and freezing conditions.

Figure 2A:
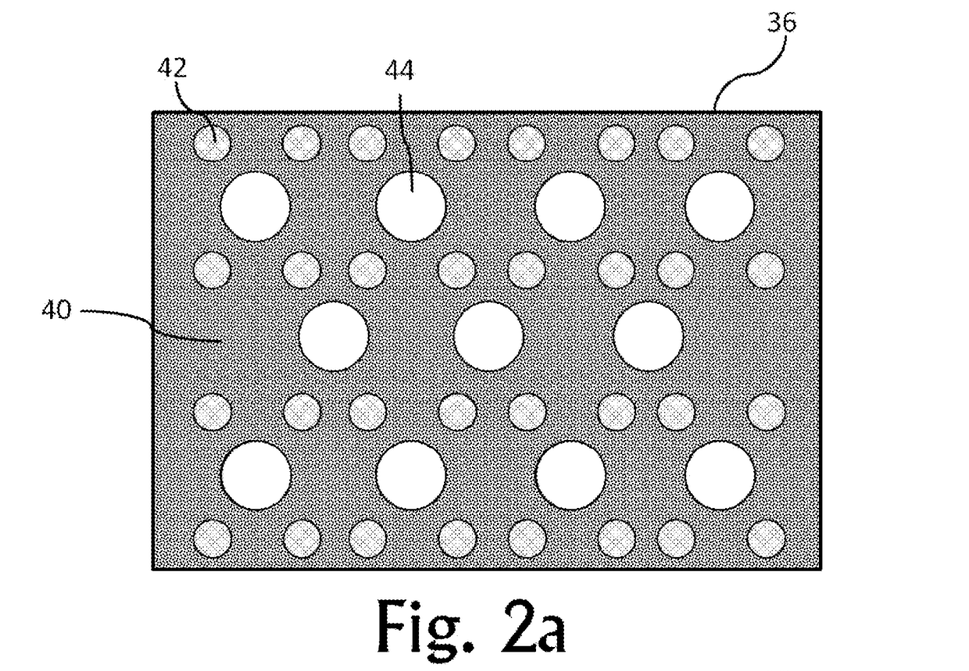
FIG. 2a is a plan view of a microporous layer structure in accordance with one or more embodiments of the present disclosure.

FIG. 2a shows an MPL 36 in accordance with at least one embodiment of the present disclosure. The MPL 36 may be composed of three types of domains. The first type of domain of the MPL 36 includes hydrophilic pores 40 which may be defined by pore diameters of 0.02 to 0.5 µm. The size and hydrophilic character of these pores 40 may be designed to mimic the primary pores that exist between catalyst agglomerates within known CLs. In at least one embodiment, the second type of domain of the MPL 36 includes hydrophobic pores 42 which may be defined by pore diameters of 0.02 to 0.5 µm. The size and hydrophobic character of these hydrophobic pores 42 may be designed to mimic the secondary pores that exist between carbon agglomerates within known CLs. The MPL 36 may also include a third type of domain comprising bores 44 having a diameter of 0.5 to 100 µm. According to various embodiments, the bores 44 may be either hydrophobic or hydrophilic. Bores 44 are designed in view of the need to transport liquid water through the GDL assembly. The MPL 36 provides for enhanced water management throughout the electrode assembly by increasing the water storage capacity of the GDL assembly, promoting liquid-to-vapor phase change, and increasing the rate of liquid water and water vapor transport.

Figure 2B:
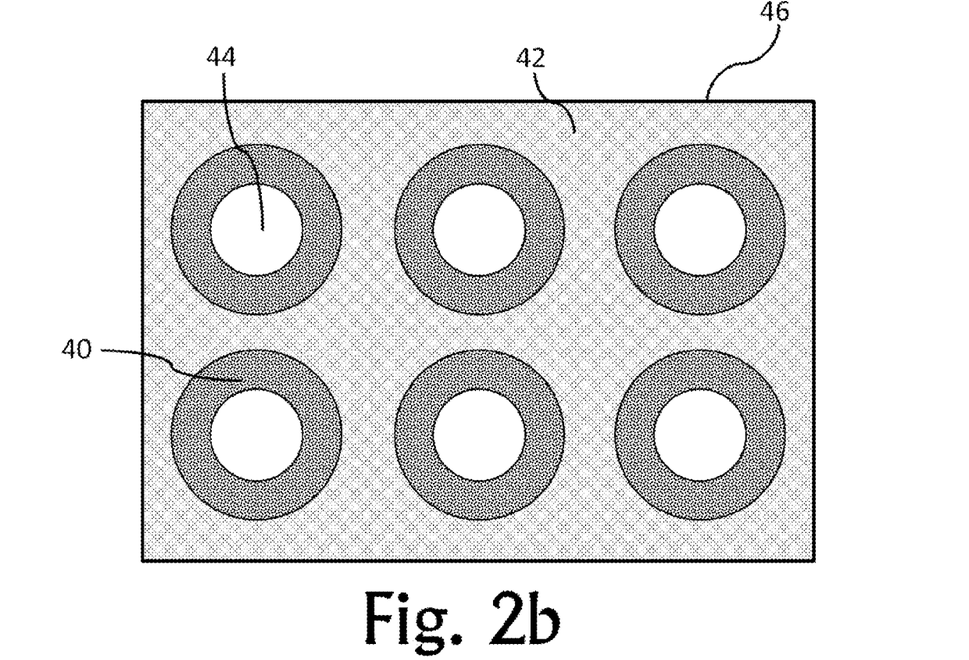
FIG. 2b is a plan view of a microporous layer structure in accordance with one or more embodiments of the present disclosure.

FIG. 2b shows an MPL 46 in accordance with at least one embodiment of the present disclosure. Like MPL 36 described above, the MPL 46 may be composed of three types of domains. MPL 46 contains an arrangement and configuration of the three potential domains that is different from that of MPL 36. The first type of domain of the MPL 46 includes hydrophilic pores 40 which may be defined by pore diameters of 0.02 to 0.5 µm. The size and hydrophilic character of these pores 40 may be designed to mimic the primary pores that exist between catalyst agglomerates within known CLs. In at least one embodiment, the second type of domain of the MPL 46 includes hydrophobic pores 42 which may be defined by pore diameters of 0.02 to 0.5 µm. The size and hydrophobic character of these hydrophobic pores 42 may be designed to mimic the secondary pores that exist between carbon agglomerates within known CLs. The MPL 46 may also include a third type of domain comprising bores 44 having a diameter of 0.5 to 100 µm. According to various embodiments, the bores 44 may be either hydrophobic or hydrophilic. Bores 44 are designed in view of the need to transport liquid water through the GDL assembly. The MPL 46, like MPL 36, provides for enhanced water management throughout the electrode assembly by increasing the water storage capacity of the GDL assembly, promoting liquid-to-vapor phase change, and increasing the rate of liquid water and water vapor transport. Since the MPLs 36 and 46 are designed based on engineering and scientific principles, they yield results that are more consistent, reproducible, and predictable than currently available MPLs.

Although FIGS. 2a and 2b show two specific examples of arrangements of the disclosed domains, the domains can be defined by any possible arrangement. The arrangement of the hydrophilic domain, hydrophobic domain, and bores can be done according to any number of appropriate designs. Furthermore, the arrangements need not be defined by any sort of regular pattern as shown in FIGS. 2a and 2b. The arrangement and design of the domains may vary from region of the MPL to another. One of ordinary skill in the art would recognize the broad range of possible domain arrangements and designs that may be produced in accordance with this disclosure.

According to at least one embodiment, the diameter of the hydrophilic pores 40 is preferably 0.05 to 0.2 µm. According to at least another embodiment, the diameter of the hydrophilic pores 40 is 5 to 20 nm. According to one or more embodiments, the diameter of the hydrophobic pores 42 is preferably 0.05 to 0.2 µm. According to at least another embodiment, the diameter of the hydrophobic pores 42 is 0.1 to 0.15 µm. According to one or more embodiments, the diameter of bores 44 is preferably 1 to 20 µm. According to at least another embodiment, the diameter of bores 44 is 100 to 200 µm.

Hydrophilic pores 40 may produce at least two benefits in the water management of the fuel cell electrode. First, the pores 40 are designed to increase the water storage capability of the electrode assembly. This result can be attributed to the hydrophilic nature of these pores and their small pore sizes, both of which allow liquid water produced in CL to be imbibed into these regions by capillary action. In accordance with Equation 2, above, assuming a similar thickness and hydrophilic porosity for the new MPL as those of a CL, the electrode water storage will double, thereby increasing the water/ice tolerance of the electrode. This result is of course beneficial for fuel cell performance at both normal operating conditions and freezing conditions. The hydrophilic pores 40 in the MPLs 36 and 46 also provide sites for liquid-to-vapor phase change, thus increasing the total surface area for water evaporation leading to increased vapor phase transport. This will in turn increase the thermal transport due to the evaporative cooling effect. Additionally, the increased water storage by hydrophilic pores 40 may contribute to membrane hydration under both drier conditions and higher operating temperatures.

Hydrophilic pores 40, which have been described as a first domain in the MPLs 36 and 46, may be formed from any suitable substance and by any suitable method. According to at least one embodiment, the hydrophilic pores 40 may include carbon particles incorporated with one or more hydrophilic polymers. Hydrophilic polymers that may be used for this purpose include polyelectrolyte, hydro-gel, conductive polymer, and other such materials. Hydrophilic pores 40 may also be formed of carbon agglomerates functionalized with sulfonic, phosphonic, or carbonic groups. According to other embodiments, hydrophilic pores 40 are formed of a semi-permeable, particle-based composition such as hydroxyl sodalite or Zr phosphates. Hydrophilic pores 40 may also be formed of a hydrophilic metal-oxide-based material such as $SiO_2$, $WO_3$, or $NbO_x$. Suitable methods for forming hydrophilic pores 40 include ink-based decal, tape casting, screen printing, and other similar methods known in the art.

Hydrophobic pores 42 in the MPLs 36 and 46 may mimic the secondary pores observed between carbon agglomerates in known CLs because of their hydrophobic wettability and small pore size. On account of these characteristics, the hydrophobic pores 42 may be free of liquid water, which will tend to be transported through bores 44 which have larger diameters and lower capillary pressure. Therefore, the hydrophobic pores 42 may provide pathways for reactant gas to transport to the adjacent CL and for water vapor to transport to the gas flow channels.

Hydrophobic pores 42, which have been described as a second domain in the MPLs 36 and 46, may be formed from any suitable substance and by any suitable method. According to at least one embodiment, the hydrophobic pores 42 may include carbon or graphite particles, carbon or graphite nanofibers, or carbon nanotubes mixed with one or more hydrophobic binders. Hydrophobic binders that may be used include fluorocarbon polymers—including polytetrafluoroethylene (PTFE) —poly(vinylidene fluoride), poly(vinylidene fluoride-co-hexafluoropropylene), and olefin-fluoride based resins, among others. Hydrophobic pores 42 may also be formed of hydrophobic, microporous substrates such as carbon or graphite foam, carbon nanotube film, expanded PTFE film impregnated with carbon or graphite particles. Suitable methods for forming hydrophobic pores 42 include ink-based decal, tape casting, screen printing, and other similar methods known in the art. Hydrophobic pores 42 may also be formed through porous film synthesis with lithography technique.

In at least one embodiment, bores 44 extend through the entire thickness of the MPLs 36 and 46. In other embodiments, bores 44 extend through at least a portion of the entire thickness of the MPLs 36 and 46. Additionally, bores 44 may be formed in any suitable manner including, for example, laser perforation following GDL fabrication and roll processing using a modified decal. While bores 44 may preferably be cylindrical or substantially cylindrical, other shapes or cross-sections may also be possible. In embodiments with non-cylindrical cross sections, the size of the bore may be defined by measurements other than the diameter. In one embodiment, the cylindrical or substantially cylindrical bores 44 have a diameter of 0.5 to 100 µm. In another embodiment, the cylindrical or substantially cylindrical bores 30 have a diameter of 0.5 to 50 µm. In another embodiment, the cylindrical or substantially cylindrical bores 44 have a diameter of diameter of 1 to 20 µm. According to various embodiments, the bores 44 may be either hydrophobic or hydrophilic. The plurality of bores may be characterized by a contact angle of between 50 and 150 degrees.

Capillary pressure is one of the main factors in the transport of liquid water in the MPLs 36 and 46. The relationship between pore size and capillary pressure is described by the Young-Laplace equation as follows:

$$p_c = \frac{4\sigma \cos\theta}{D_p} \quad (4)$$

where
$p_c$ is the capillary pressure;
$\sigma$ is the surface tension of water;
$\theta$ is the contact angle of water within the pore or bore; and
$D_p$ is the pore diameter.

The diameter of bores 44 may thus be chosen based on capillary pressure conditions that exist in GDL assemblies. By designing the bores 44 based on observed capillary pressures, liquid water will be transported through the bores 44, thereby leaving the hydrophobic pores 42 open in order to transport reactant gas and water vapor. In at least one embodiment, the bores 44 are characterized by a hydrophobic wettability that is less than the hydrophobic wettability of the hydrophobic pores 42. Accordingly, liquid water will be preferably transported through bores 44 leaving hydrophobic pores 42 open for the transport of gas and water vapor.

The bores 44 included in the MPL 36 can be created by any suitable method. The bores 44 may be holes mechanically punched into the decal or substrate during fabrication of the MPL. Alternatively, bores 44 may be created by laser perforation of the manufactured MPL. The bores 44 could also include cracks engineered in MPL or straight channels, like capillary tubes and/or hollow fibers, added to the MPL during the fabrication of the MPL.

The term "hydrophilic" is used herein, with respect to one or more embodiments, to describe the wettability of a given surface that is characterized by a contact angle for water that is less than 90 degrees. Additionally, the term "hydrophobic" is used herein, with respect to one or more embodiments, to describe the wettability of a given surface that is characterized by a contact angle for water that is greater than 90 degrees. The term "pore" is used herein, with respect to one or more embodiments, to describe the voids or empty volume formed naturally among the material, such as carbon particles and polymer binders, used to form each of the domains of the MPL. The term "bore" is used herein, with respect to one or more embodiments, to describe the hole or void formed in the MPL by using manufacturing methods like laser peroration, mechanical punch, capillary tube, and other similar techniques.

Figure 3:
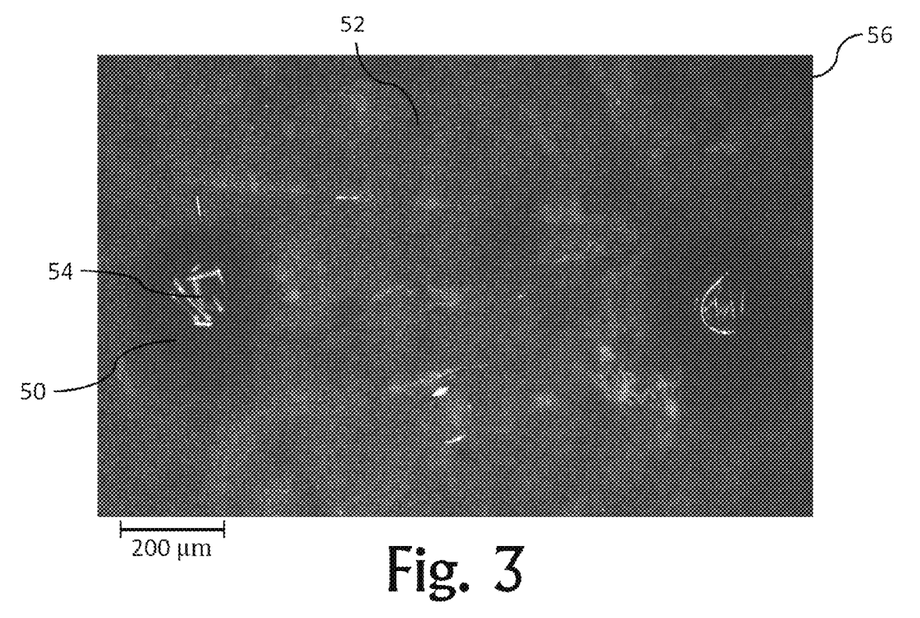
FIG. 3 is a magnified image showing a portion of the surface of a microporous layer in accordance with one or more embodiments of the present disclosure.

FIG. 3 shows an SEM micrograph of a portion of the surface of a sample microporous layer 56 made in accordance with one or more embodiments of the present disclosure. The arrangement of the domains within MPL 56 is similar to that shown in FIG. 2b. MPL 56 includes a plurality of bores 54 having diameters of approximately 100 µm. MPL 56 also includes regions or domains 50 comprised of a plurality of hydrophilic pores. In the SEM micrograph shown in FIG. 3, regions 50 appear as dark ring-shaped regions around bores 54. In this example, the regions 50 extend for a distance of approximately 50 µm beyond the circumference of bores 54. The portions of MPL 56 that do not include either bores 54 or hydrophilic pore regions 50, include a plurality of hydrophobic pores defined by pore sizes in the range of 0.05-0.5 µm.

Figure 4:
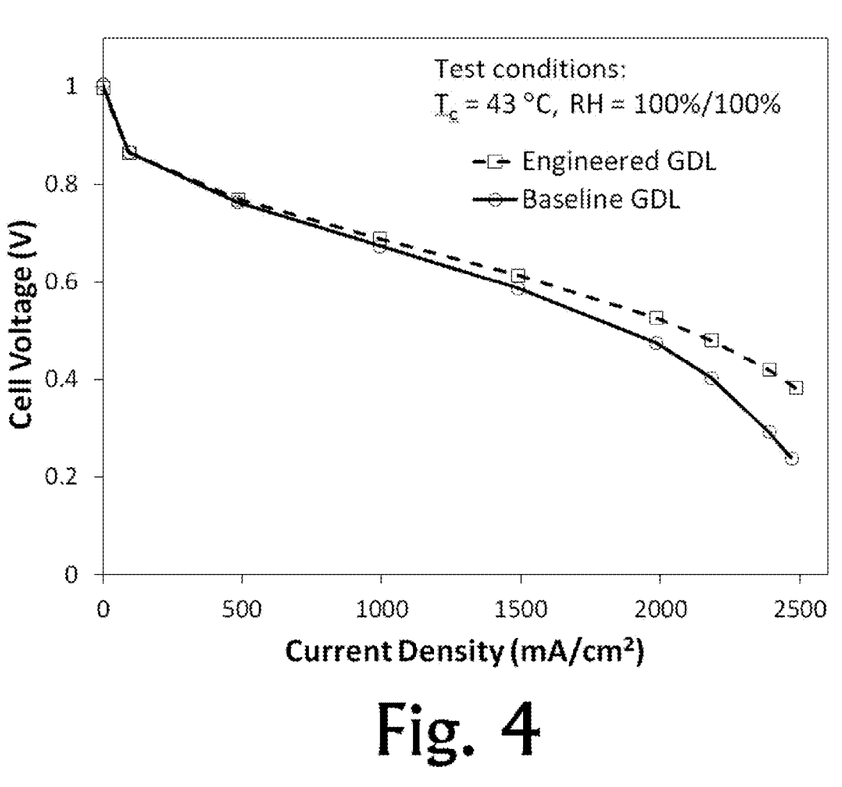
FIG. 4 is a graph showing the performance of a sample gas diffusion layer assembly made in accordance with the present disclosure versus that of a conventional gas diffusion layer assembly under typical warm-up conditions.
Figure 5:
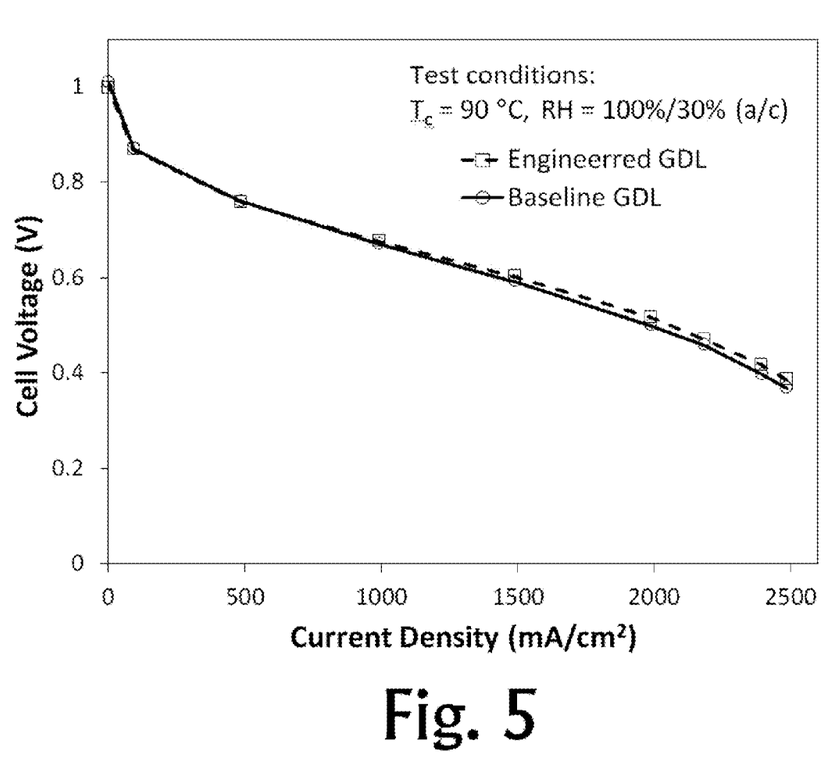
FIG. 5 is a graph showing the performance of a sample gas diffusion layer assembly made in accordance with the present disclosure versus that of a conventional gas diffusion layer assembly under typical hot and dry conditions.

FIG. 4 is a sample graph showing the fuel cell performance of a gas diffusion layer assembly made in accordance with the present disclosure versus that of a conventional gas diffusion layer assembly under typical warm-up conditions. Similarly, FIG. 5 is a sample graph showing the performance of a gas diffusion layer assembly made in accordance with the present disclosure versus that of a conventional gas diffusion layer assembly under typical hot and dry conditions. For both FIGS. 4 and 5, the fuel cell performance, as demonstrated by a polarization curve for a PEMFC system, was evaluated in a single cell with an active area of 48.4 cm². For the tests, hydrogen was supplied to the anode and air was supplied to the cathode. Hydrogen and air flow rates were fixed at 2 L/min and 12 L/min, respectively. The cell temperature was varied in the range of 40 to 90° C. The anode inlet relative humidity (RH) was fixed at 100% while the cathode RH varied between 30% and 100%. As these two graphs illustrate, incorporation of MPLs made in accordance with one or more embodiments has the potential to produce enhanced fuel cell operation as a result of improvements in water management within the electrode.

Figure 6:
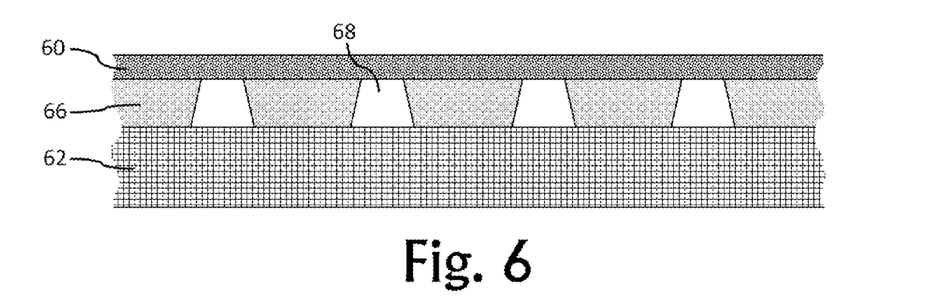
FIG. 6 is a cross-sectional view of a portion of a fuel cell assembly showing a catalyst layer and a gas diffusion layer including a microporous layer in accordance with one or more embodiments of the present disclosure.
Figure 7:
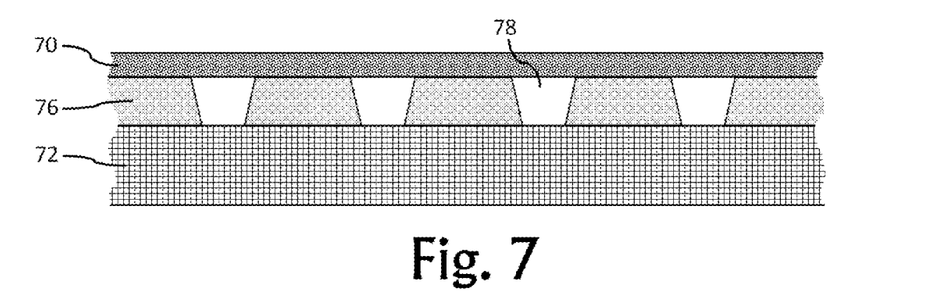
FIG. 7 is a cross-sectional view of a portion of a fuel cell assembly showing a catalyst layer and a gas diffusion layer including a microporous layer in accordance with one or more embodiments of the present disclosure.

Although the bores in the MPLs disclosed herein have generally been described as cylindrical or substantially cylindrical, other configurations are certainly within the scope of this disclosure. For example, the bores included in MPLs according to this disclosure may be defined by a variable cross section along the thickness of the MPL. FIGS. 6 and 7 each illustrate a cross-sectional view of a portion of a fuel cell assembly showing a catalyst layer (60 and 70, respectively) and a gas diffusion layer (62 and 72, respectively) separated from the catalyst layer (60, 70) by a microporous layer (66 and 76, respectively) in accordance with one or more embodiments of the present disclosure. As can be seen in FIG. 6, bores 68 are formed in MPL 66. As illustrated in cross section, the bores 68 are defined by a generally frustoconical shape which tapers inward from the surface of the microporous layer adjacent the gas diffusion layer to the surface of the microporous layer adjacent the catalyst layer. Alternatively, FIG. 7 shows MPL 76 including bores 78 that are defined by a generally frustoconical shape which tapers inward from the surface of the microporous layer adjacent the catalyst layer to the surface of the microporous layer adjacent the gas diffusion layer.

According to at least one embodiment, the MPL may comprise a single, unitary layer coated on the CL-facing side of the GDL. Alternatively, in accordance with other embodiments, the MPL may include two or more layers having different pore size and/or wettability properties. Additionally, single- or multi-layer MPLs in accordance with this disclosure may include wettability characteristics that vary along the thickness of the MPL.

This application is related to U.S. application Ser. No. 13/832,358, filed Mar. 15, 2013, the disclosure of which is herein incorporated by reference in its entirety.

Although this disclosure is particularly directed to gas diffusion layer assemblies including specific microporous layer architectures for use in proton exchange membrane fuel cells, the disclosed microporous layers may also be used in other types of fuel cell designs to produce some or all of the beneficial effects described herein with relation to PEMFCs. Additional types of fuel cells, in which the disclosed microporous layers may be incorporated, include direct methanol fuel cells (DMFCs), direct ethanol fuel cells (DEFCs), and other known fuel cell designs. Those of ordinary skill in the art would recognize that certain features of the embodiments described herein could be put to beneficial use in such other fuel cell applications.

While exemplary embodiments are described herein, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A microporous layer configured to be disposed between a catalyst layer and a gas diffusion layer of a fuel cell electrode assembly, the microporous layer comprising:
   a plurality of hydrophilic pores;
   a plurality of hydrophobic pores with a diameter of 0.02 to 0.5 µm; and
   a plurality of bores with a diameter of 0.5 to 100 µm.

2. The microporous layer of claim 1, wherein the hydrophobic pores have a diameter of 0.05 to 0.2 µm and the plurality of bores have a diameter of 1 to 20 µm.

3. The microporous layer of claim 1, wherein the hydrophilic pores have a diameter of 0.05 to 0.2 µm.

4. The microporous layer of claim 1, wherein the hydrophilic pores have a diameter of 5 to 20 nm.

5. The microporous layer of claim 1, wherein the plurality of hydrophilic pores, the plurality of hydrophobic pores, and the plurality of bores are defined in a first material layer, and further comprising a second material layer configured to be disposed between the catalyst layer and the first material layer, and including carbon and one or more fluorocarbon polymers.

6. The microporous layer of claim 1, wherein the hydrophilic pores are formed of carbon particles, carbon nanofibers, or carbon nanotubes treated with one or more hydrophilic polymers.

7. The microporous layer of claim 1, wherein the hydrophilic pores are formed of carbon agglomerates functionalized with sulfonic, phosphonic, or carbonic groups.

8. The microporous layer of claim 1, wherein the hydrophilic pores are formed of a hydrophilic metal oxide.

9. The microporous layer of claim 1, wherein the hydrophobic pores are formed of carbon particles, carbon nanofibers, or carbon nanotubes treated with one or more hydrophobic fluorocarbon binders.

10. The microporous layer of claim 1, wherein the plurality of hydrophilic pores, the plurality of hydrophobic pores, and the plurality of bores are defined in a first material layer, the first material layer including two or more material regions, wherein at least two of the material regions are comprised of different substances.

11. A microporous layer configured to be disposed between a catalyst layer and a gas diffusion layer of a fuel cell electrode assembly, the microporous layer comprising:
   a material layer having defined therein a plurality of hydrophilic pores, a plurality of hydrophobic pores with a diameter of 0.05 to 0.2 µm, and a plurality of frustoconical bores, each having a base end having a diameter of 0.5 to 100 µm.

12. The microporous layer of claim 11, wherein the plurality of hydrophilic pores have a diameter that is less than the diameter of the plurality of hydrophobic pores.

13. The microporous layer of claim 11, wherein the plurality of frustoconical bores taper inward from the surface of the microporous layer adjacent the catalyst layer to the surface of the microporous layer adjacent the gas diffusion layer.

14. The microporous layer of claim 11, wherein the plurality of frustoconical bores taper inward from the surface of the microporous layer adjacent the gas diffusion layer to the surface of the microporous layer adjacent the catalyst layer.

* * * * *